(12) United States Patent
Hong

(10) Patent No.: US 11,797,658 B2
(45) Date of Patent: Oct. 24, 2023

(54) APPARATUS AND METHOD OF BLINDING HANDWRITTEN SIGNATURE FOR AUTHENTICATION

(71) Applicant: SECUVE Co., Ltd., Seoul (KR)

(72) Inventor: Ki-Yoong Hong, Seoul (KR)

(73) Assignee: SECUVE Co., Ltd., Seoul (KR)

( * ) Notice: Subject to any disclaimer, the term of this patent is extended or adjusted under 35 U.S.C. 154(b) by 264 days.

(21) Appl. No.: 16/758,768

(22) PCT Filed: Apr. 6, 2020

(86) PCT No.: PCT/KR2020/004642
§ 371 (c)(1),
(2) Date: Apr. 23, 2020

(87) PCT Pub. No.: WO2021/112340
PCT Pub. Date: Jun. 10, 2021

(65) Prior Publication Data
US 2023/0113309 A1    Apr. 13, 2023

(30) Foreign Application Priority Data

Dec. 6, 2019 (KR) .................. 10-2019-0161313

(51) Int. Cl.
*G06F 21/00* (2013.01)
*G06F 21/32* (2013.01)

(52) U.S. Cl.
CPC .................. *G06F 21/32* (2013.01)

(58) Field of Classification Search
CPC ......... G06F 21/32; G06F 21/31; G06F 21/36; G06F 7/58; G06F 2221/0748; G06F 2221/2133; G06V 40/30
See application file for complete search history.

(56) References Cited

U.S. PATENT DOCUMENTS

| | | | |
|---|---|---|---|
| 10,733,325 B1* | 8/2020 | Goodsitt | G06V 10/764 |
| 2016/0042165 A1* | 2/2016 | Nicholson | G06V 30/1423 726/19 |
| 2016/0321214 A1* | 11/2016 | Hickey | G06F 40/169 |
| 2017/0329944 A1* | 11/2017 | Satyavarapu | G06F 21/31 |

* cited by examiner

*Primary Examiner* — Brandon Hoffman
*Assistant Examiner* — William A Corum, Jr.
(74) *Attorney, Agent, or Firm* — Studebaker & Brackett PC

(57) ABSTRACT

The present invention relates to a handwritten signature authentication apparatus and method. More particularly, the present invention relates to an apparatus and a method of blinding a handwritten signature for authentication in which when a user writes a handwritten signature, a handwritten signature image displayed on a display device is blinded from a third party nearby.

14 Claims, 9 Drawing Sheets

101

102

103

104

201

202

203

204

205

301

302

303

304

305

401

402

501

502

APPARATUS AND METHOD OF BLINDING HANDWRITTEN SIGNATURE FOR AUTHENTICATION

CROSS-REFERENCE TO RELATED APPLICATIONS

This application is a National Stage of International Application No. PCT/KR2020/004642, filed Apr. 6, 2020, which claims benefit of priority to Korean Patent Application No. 10-2019-0161313 filed Dec. 6, 2019, the entire content of which is incorporated herein by reference.

BACKGROUND OF THE INVENTION

Field of the Invention

The present invention relates to a handwritten signature authentication apparatus and method. More particularly, the present invention relates to an apparatus and a method of blinding a handwritten signature for authentication in which when a user writes a handwritten signature, a handwritten signature image displayed on a display device and a handwritten signature behavioral characteristics are blinded from a third party nearby.

Description of the Related Art

As the Internet is easy to use and is widely used, most people use various services over the Internet.

Services provided over the Internet are provided to users only online, so in order to prevent identity theft by a third party, there is a need for a means to identify who has requested a service and whether the person is a legitimate user with respect to information input to use the service.

In response to this demand, various techniques have been developed and applied in which it is identified whether a service user is a user, namely, the identical person, who has the appropriate authority over the information input to use the service.

Representative one of these techniques is a handwritten signature authentication technique that reflects user's personal features.

The handwritten signature authentication technique that authenticates the user online and offline without an authentication means (a card, an identity card, a one-time password (OTP), etc.).

Examples of the handwritten signature authentication technique include the following methods, and the like: an image comparison method in which consistency in the shape in the handwritten signature image is checked, a behavioral characteristics comparison method in which when a signatory writes the handwritten signature, handwritten signature behavioral characteristics data of signatory is compared.

Generally, a handwritten signature apparatus to which the handwritten signature authentication technique is applied displays an image of the handwritten signature that the user is writing, on a display device so the user can see the image.

As described above, since the existing handwritten signature apparatus displays the handwritten signature that the user is writing, there are problems that a third party nearby can easily see the handwritten signature displayed through the display device and that the handwritten signature image can be easily acquired.

Moreover, in the case where the user's handwritten signature is relatively simple, there is a risk of theft when a third party peeks, imitates the handwritten signature, or secretly photographs the handwritten signature to repeatedly train to copy the handwritten signature. The foregoing is intended merely to aid in the understanding of the background of the present invention, and is not intended to mean that the present invention falls within the purview of the related art that is already known to those skilled in the art.

Document of Related Art (Patent Document 1) Korean Patent No. 10-1575577 (published, Nov. 26, 2015)

SUMMARY OF THE INVENTION

Accordingly, the present invention has been made keeping in mind the above problems occurring in the related art, and the present invention is intended to propose an apparatus and a method of blinding a handwritten signature for authentication in which when a user writes a handwritten signature, a handwritten signature image displayed on a display device and a handwritten signature behavioral characteristics are blinded from a third party nearby.

In order to achieve the above objective, according to one aspect of the present invention, there is provided an apparatus for blinding a handwritten signature for authentication, the apparatus including: a handwritten signature input unit outputting handwritten signature sequence data as a result of writing a handwritten signature by a user; a display unit; and a control unit generating a handwritten signature image corresponding to the handwritten signature sequence data acquired from the handwritten signature input unit, the control unit blinding at least part of the handwritten signature image according to preset blinding setting information and displaying an unblinded part of the handwritten signature on the display unit.

The control unit may include: a handwritten signature acquisition unit generating and outputting a handwritten signature sequence image corresponding to the handwritten signature sequence data acquired from the handwritten signature input unit; and a blinding display control unit displaying, when the handwritten signature sequence image is started to be input and the writing of the handwritten signature is completed, the handwritten signature image constructed of the input handwritten signature sequence image only for a predetermined time on the display unit according to the blinding setting information, and then deleting the handwritten signature image.

The control unit may include: a handwritten signature acquisition unit generating and outputting a handwritten signature sequence image corresponding to the handwritten signature sequence data acquired from the handwritten signature input unit; a handwritten signature blinding pre-processing unit generating handwritten signature segment images by dividing the handwritten signature sequence image according to a segment division condition of the preset blinding setting information, and outputting the generated handwritten signature segment images; and a blinding display control unit displaying, when the handwritten signature segment images are started to be input, only an unblinded part of the handwritten signature segment images that are input until the whole handwritten signature image is generated on the display unit according to the blinding setting information.

The handwritten signature blinding pre-processing unit may include: a handwritten signature segment image generation unit dividing the handwritten signature sequence image according to the segment division condition of the preset blinding setting information so as to generate and output the handwritten signature segment images; and a handwritten signature image generation unit receiving any one or more among the handwritten signature sequence image and the handwritten signature segment images to generate and output the handwritten signature image, and the blinding display control unit may display the handwritten signature segment images in order according to the blinding setting information.

The handwritten signature blinding pre-processing unit may further include: a handwritten signature segment image generation unit dividing the handwritten signature sequence image according to the segment division condition of the preset blinding setting information so as to generate and output the handwritten signature segment images; a handwritten signature image generation unit receiving any one or more among the handwritten signature sequence image and the handwritten signature segment images to generate and output the handwritten signature image; and a randomization unit randomly shuffling a sequence of the handwritten signature segment images output from the handwritten signature segment image generation unit according to the blinding setting information, and outputting the handwritten signature segment images to the blinding display control unit.

The control unit may include: a handwritten signature acquisition unit generating and outputting a handwritten signature sequence image corresponding to the handwritten signature sequence data acquired from the handwritten signature input unit; and a blinding display control unit displaying, when the handwritten signature sequence image is started to be input, the handwritten signature sequence image on the display unit according to the blinding setting information, wherein the blinding display control unit may include: a pseudo noise generation unit generating and outputting a pseudo noise image; and a handwritten signature display image generation unit, according to the blinding setting information, intactly outputting the handwritten signature sequence image input from the handwritten signature acquisition unit or composing the handwritten signature sequence image with the pseudo noise image to output a result of the composition.

The blinding setting information may include one or more among blinding coverage setting information for setting whether a whole or only a part of the handwritten signature being written is blinded, segment division condition information in a case of partial blinding, segment randomization information indicating whether the divided handwritten signature segment images are displayed in order or in a randomly shuffled manner, pseudo noise image composition information indicating whether a pseudo noise image is composed with the handwritten signature image for display, temporary display information of a final handwritten signature image which indicates whether the handwritten signature image is displayed only for a predetermined time when the writing of the handwritten signature is completed, information on setting the number of handwritten signature segments to be displayed, random display information indicating whether positions to be displayed are randomly displayed when the number of the handwritten signature segments to be displayed is two or more according to the information on setting the number of the handwritten signature segments to be displayed, a transparency level value, filtering option information indicating whether filtering is applied, and information on whether the two or more handwritten signature segments are displayed close together. The segment division condition may include any one or more among a predetermined time, a predetermined space, writing with a break, a syllable, and a letter, wherein the predetermined time may be a predetermined time basis or random time basis for dividing the input handwritten signature sequence image and the predetermined space may be a predetermined-sized space basis or random-sized space basis for dividing the input handwritten signature sequence image.

A filter may be applied to the handwritten signature image to generate and output a filtered handwritten signature image.

Regarding the handwritten signature segment images, the preceding handwritten signature segment image may be made to be faint or may be displayed by increasing a transparency level, and only the currently displayed handwritten signature segment image may be displayed normally.

A filter may be applied to the handwritten signature segment images to generate and output a filtered handwritten signature image.

In order to achieve the above objective, according to another aspect of the present invention, there is provided a method of blinding a handwritten signature for authentication, the method including: a handwritten signature sequence image generation process in which a control unit generates a handwritten signature sequence image corresponding to handwritten signature sequence data acquired from a handwritten signature input unit; and a handwritten signature image and handwritten signature behavioral characteristics blinding process in which the control unit generates a handwritten signature image corresponding to the handwritten signature sequence data acquired from the handwritten signature input unit, blinds at least part of the handwritten signature image according to preset blinding setting information, and displays an unblinded part of the handwritten signature on a display unit.

The handwritten signature image and handwritten signature behavioral characteristics blinding process may include: a handwritten signature acquisition step in which through a handwritten signature acquisition unit, the control unit generates and outputs the handwritten signature sequence image corresponding to the handwritten signature sequence data acquired from the handwritten signature input unit; and a blinding display control step in which through a blinding display control unit, the control unit displays, when the handwritten signature sequence image is started to be input and when writing of a handwritten signature is completed, the handwritten signature image constructed of the input handwritten signature sequence image only for a predetermined time according to the blinding setting information on the display unit, and then deletes the handwritten signature image.

The handwritten signature image and handwritten signature behavioral characteristics blinding process may include: a handwritten signature acquisition step in which through a handwritten signature acquisition unit, the control unit generates and outputs the handwritten signature sequence image corresponding to the handwritten signature sequence data acquired from the handwritten signature input unit; a handwritten signature blinding pre-processing step in which through a handwritten signature blinding pre-processing unit, the control unit generates handwritten signature segment images by dividing the handwritten signature sequence image according to a segment division condition of the preset blinding setting information, and outputs the generated handwritten signature segment images; and a blinding display control step in which through a blinding display control unit, the control unit displays, when the handwritten signature segment images are started to be input, only an unblinded part of the handwritten signature segment images that are input until the whole handwritten signature image is generated on the display unit according to the blinding setting information.

The handwritten signature blinding pre-processing step may include: a handwritten signature segment image generation step in which through a handwritten signature segment image generation unit, the control unit divides the handwritten signature sequence image according to the segment division condition of the preset blinding setting information so as to generate and output the handwritten signature segment images; and a handwritten signature image generation step in which through a handwritten signature image generation unit, the control unit receives any one or more among the handwritten signature sequence image and the handwritten signature segment images to generate and output the handwritten signature image, and at the blinding display control step, only the unblinded part of the handwritten signature segment images may be displayed in order according to the blinding setting information.

The handwritten signature blinding pre-processing step may further include: a handwritten signature segment image generation step in which through a handwritten signature segment image generation unit, the control unit divides the handwritten signature sequence image according to the segment division condition of the preset blinding setting information so as to generate and output the handwritten signature segment images; a handwritten signature image generation step in which through a handwritten signature image generation unit, the control unit receives any one or more among the handwritten signature sequence image and the handwritten signature segment images to generate and output the handwritten signature image; and a randomization step in which through a randomization unit, the control unit randomly shuffles a sequence of the handwritten signature segment images output from the handwritten signature segment image generation unit according to the blinding setting information and outputs the handwritten signature segment images to the blinding display control unit, and at the blinding display control step, the handwritten signature segment images may be displayed in randomly shuffled order.

The handwritten signature image and handwritten signature behavioral characteristics blinding process may include: a handwritten signature acquisition step in which through a handwritten signature acquisition unit, the control unit generates and outputs the handwritten signature sequence image corresponding to the handwritten signature sequence data acquired from the handwritten signature input unit; and a blinding display control step in which through a blinding display control unit, the control unit displays, when the handwritten signature sequence image is started to be input, the handwritten signature sequence image on the display unit according to the blinding setting information, wherein the blinding display control step may include: a pseudo noise generation step in which a pseudo noise image is generated and output; and a handwritten signature display image generation step in which according to the blinding setting information, the handwritten signature sequence image input from the handwritten signature acquisition unit is intactly output or the handwritten signature sequence image is composed with the pseudo noise image and a result of the composition is output.

The blinding setting information may include one or more among blinding coverage setting information for setting whether a whole or only a part of the handwritten signature being written is blinded, segment division condition information in a case of partial blinding, segment randomization information indicating whether handwritten signature segment images resulting from division are displayed in order or in a randomly shuffled manner, pseudo noise image composition information indicating whether a pseudo noise image is composed with the handwritten signature image for display, temporary display information of a final handwritten signature image which indicates whether the handwritten signature image is displayed only for a predetermined time when writing of the handwritten signature is completed, information on setting the number of handwritten signature segments to be displayed, random display information indicating whether positions to be displayed are randomly displayed when the number of the handwritten signature segments to be displayed is two or more according to the information on setting the number of the handwritten signature segments to be displayed, a transparency level value, filtering option information indicating whether filtering is applied, and information on whether the two or more handwritten signature segments are displayed close together. The segment division condition may include any one or more among a predetermined time, a predetermined space, writing with a break, a syllable, and a letter, wherein the predetermined time may be a predetermined time basis or random time basis for dividing the input handwritten signature sequence image and the predetermined space may be a predetermined-sized space basis or random-sized space basis for dividing the input handwritten signature sequence image.

A filter may be applied to the handwritten signature image to generate and output a filtered handwritten signature image.

Regarding the handwritten signature segment images, the preceding handwritten signature segment image may be made to be faint or may be displayed by increasing a transparency level for output, and only the currently displayed handwritten signature segment image may be displayed normally.

A filter may be applied to the handwritten signature segment images to generate and output a filtered handwritten signature image.

Advantageous Effects

According to the present invention, the handwritten signature that the user is writing is blinded so that it is impossible or difficult for a third party nearby to see an image of the handwritten signature that the user is writing and the handwritten signature behavioral characteristics, thereby preventing leakage and theft of the handwritten signature.

Also, according to the present invention, only a part of the handwritten signature that the user is writing is displayed so that the user can identify whether he or she is writing the handwritten signature correctly and the handwritten signature image and the handwritten signature behavioral characteristics are not exposed to a third party.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Hereinafter, a configuration and an operation of an apparatus for blinding a handwritten signature for authentication according to the present invention and a method, which is performed by the apparatus for blinding a handwritten signature for authentication, of blinding a handwritten signature for authentication will be described in detail with reference to the accompanying drawings.

Figure 1:
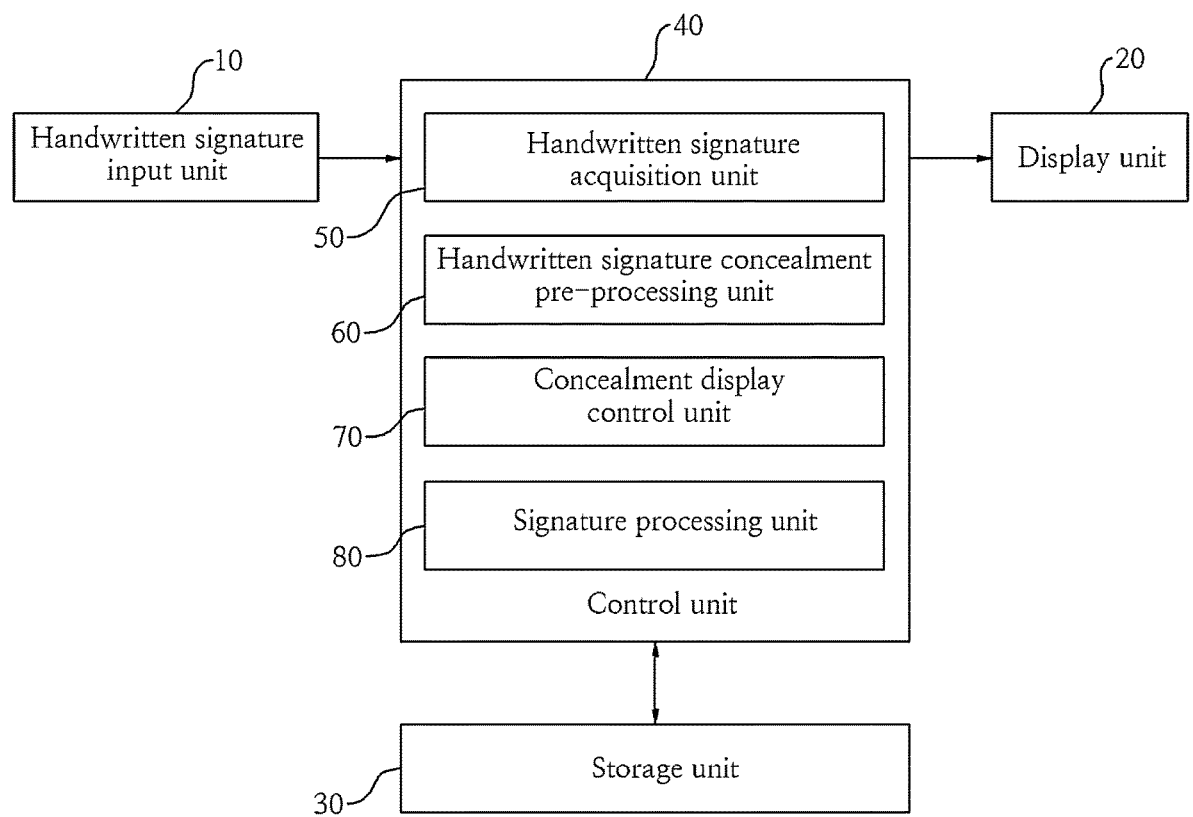
FIG. 1 is a diagram illustrating a configuration of an apparatus for blinding a handwritten signature for authentication according to the present invention.

FIG. 1 is a diagram illustrating a configuration of an apparatus for blinding a handwritten signature for authentication according to the present invention.

Referring to FIG. 1, the apparatus for blinding the handwritten signature for authentication according to the present invention includes a handwritten signature input unit 10, a display unit 20, a storage unit 30, and a control unit 40.

The handwritten signature input unit 10 acquires handwritten signature sequence data as a result of handwriting a signature by the user and outputs the handwritten signature sequence data to the control unit 40.

The handwritten signature input unit 10 is configured in the form of a touchpad, a pen, or the like, which are configured integrally or separately from a screen of the display unit 20 so that the handwritten signature input unit 10 outputs the handwritten signature sequence data as a result of writing the handwritten signature by the user.

The display unit 20 displays information as a result of an operation state of the apparatus for blinding the handwritten signature for authentication of the present invention and displays the handwritten signature in a manner that blinds a part or more thereof according to the present invention. The part or more refers to the whole of the part of the handwritten signature.

The storage unit 30 includes a program area storing a control program for controlling the overall operation of the apparatus for blinding the handwritten signature for authentication according to the present invention, a temporary storage area temporarily storing data generated during the execution of the control program, and a data area storing data generated during the execution of the control program and data required for the execution of the control program. In the data area, blinding setting information according to the present invention may be stored.

The blinding setting information may include one or more among the following pieces of information: blinding coverage setting information for setting whether the whole or only a part of the handwritten signature being written is blinded, segment division condition information in the case of partial blinding, segment randomization information indicating whether the handwritten signature segment images resulting from the division are displayed in order or in a randomly shuffled manner, pseudo noise image composition information indicating whether a pseudo noise image is composed with the handwritten signature image for display, temporary display information of a final handwritten signature image which indicates whether the handwritten signature image is displayed only for a predetermined time when writing of the handwritten signature is completed, information on setting the number of handwritten signature segments to be displayed, random display information indicating whether positions to be displayed are randomly displayed when the number of the handwritten signature segments to be displayed is two or more which is indicated by the information on setting the number of the handwritten signature segments to be displayed, a transparency level value, filtering option information indicating whether filtering is applied, information on whether the two or more handwritten signature segments are displayed close together, and the like, according to an embodiment. The segment division condition information may include any one or more among a predetermined time, a predetermined space, writing with a break, a syllable, a letter, and the like. The predetermined time refers to dividing an input handwritten signature sequence image on the basis of a predetermined time or a random time. The predetermined space refers to dividing an input handwritten signature sequence image on the basis of a space in a predetermined size or a random size. The writing with a break refers to dividing on the basis of the case of writing with a break in which when the user writes a handwritten signature, the user takes the pen or hand off from the touchpad and writes again. The syllable refers to dividing on a per-syllable basis. The letter refers to dividing on a per-letter (Hangul alphabet for Korean, alphabet for English, etc.) basis. Herein, the transparency level value is set to a value ranging from 0 to 100. For example, when the transparency level value is 100, the handwritten signature segment images are invisibly displayed. When the transparency level value is 90, the handwritten signature segment images are faintly displayed.

The control unit 40 includes a handwritten signature acquisition unit 50, a blinding display control unit 70, and a handwritten signature processing unit 80. According to an embodiment, the control unit 40 further includes a handwritten signature blinding pre-processing unit 60. The control unit 40 controls the overall operation of the apparatus for blinding the handwritten signature for authentication according to the present invention.

Specifically, the handwritten signature acquisition unit 50 generates the handwritten signature sequence image corresponding to the handwritten signature sequence data obtained from the handwritten signature input unit 10 and outputs the handwritten signature sequence image.

The handwritten signature blinding pre-processing unit 60 divides the handwritten signature sequence image output from the handwritten signature acquisition unit 50 according to the segment division condition of the preset blinding setting information and thus outputs the handwritten signature segment images. Selectively, the handwritten signature blinding pre-processing unit 60 performs randomization pre-processing in which the sequence of the handwritten signature segment images is randomly shuffled according to the segment randomization information of the blinding setting information, and outputs the result.

According to an embodiment, the blinding display control unit 70 generates a handwritten signature image using the handwritten signature sequence image input from the handwritten signature acquisition unit 50 and does not display or briefly displays, only for a predetermined time, the handwritten signature image on the display unit 20 according to the blinding coverage setting information of the blinding setting information.

Also, according to another embodiment, the blinding display control unit 70 displays, on the display unit 20, the handwritten signature segment images in order, which are results of the dividing according to the segment division condition information of the blinding setting information, or displays the handwritten signature segment images of which the sequence is randomly shuffled.

Also, according to still another embodiment, the blinding display control unit 70 composite a pseudo noise image and the handwritten signature sequence image for display or compose a pseudo noise image and the handwritten signature segment images for display according to the pseudo noise image composition information of the blinding setting information. The pseudo noise image may refer to an image including an image of any figure so that the handwritten signature image is hardly seen from the surrounding areas.

The handwritten signature processing unit 80 acquires handwritten signature characteristics information using the handwritten signature sequence data, performs handwritten signature authentication using either the acquired handwritten signature characteristics information or the handwritten signature image, and process a corresponding operation according to the result of the authentication. The handwritten signature characteristics information may include handwritten signature image information and handwritten signature behavioral characteristics information. The handwritten signature processing unit 80 may perform any one or more among handwritten signature authentication based on the handwritten signature image information and handwritten signature authentication based on the behavioral characteristics information.

Figure 2:
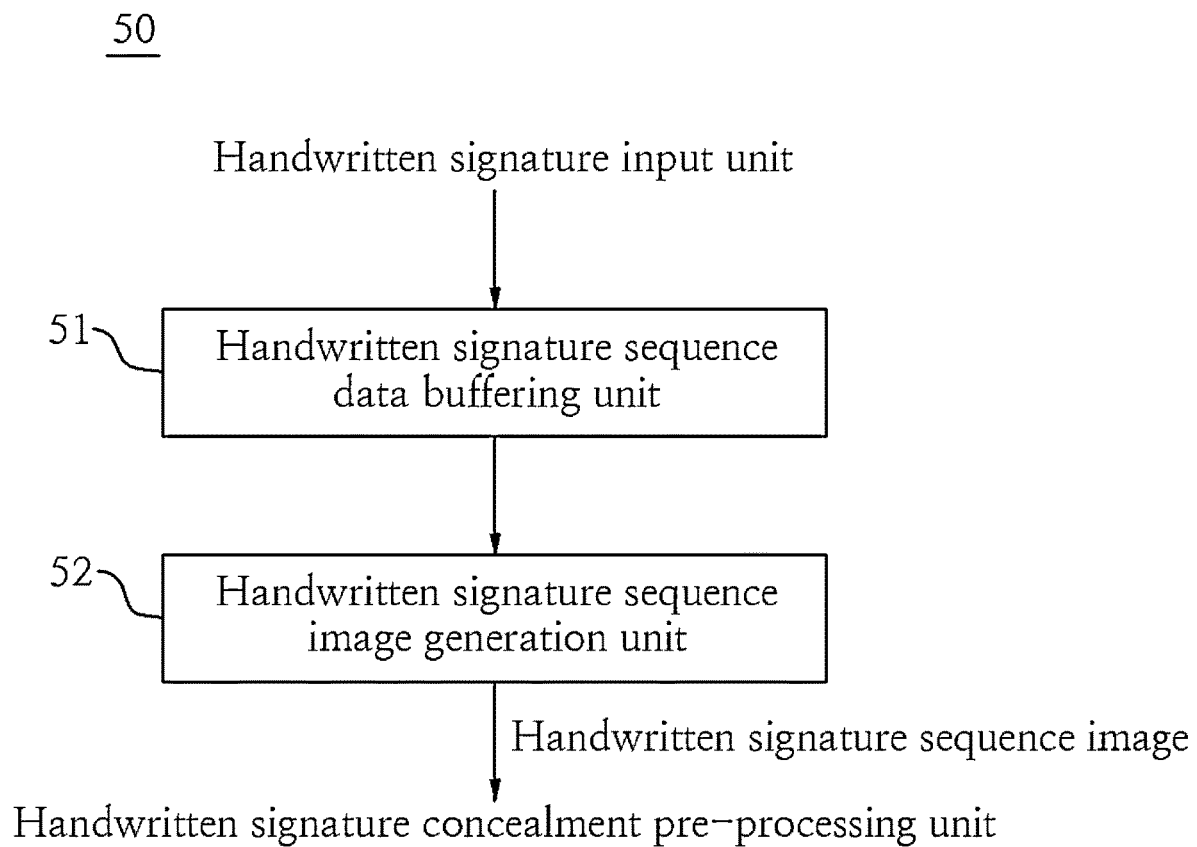
FIG. 2 is a diagram illustrating a configuration of a handwritten signature acquisition unit of an apparatus for blinding a handwritten signature for authentication according to the present invention.

FIG. 2 is a diagram illustrating a configuration of a handwritten signature acquisition unit 50 of an apparatus for blinding a handwritten signature for authentication according to the present invention.

Referring to FIG. 2, the handwritten signature acquisition unit 50 includes a handwritten signature sequence data buffering unit 51, and a handwritten signature sequence image generation unit 52.

The handwritten signature sequence data buffering unit 51 buffers the handwritten signature sequence data input from the handwritten signature input unit 10 and outputs the buffered handwritten signature sequence data to the handwritten signature sequence image generation unit 52 at predetermined-time intervals.

The handwritten signature sequence image generation unit 52 generates the handwritten signature sequence image for the handwritten signature sequence data input from the handwritten signature sequence data buffering unit 51 and outputs the handwritten signature sequence image to either the handwritten signature blinding pre-processing unit 60 or the blinding display control unit 70 on the basis of the blinding setting information according to an embodiment.

Figure 3:
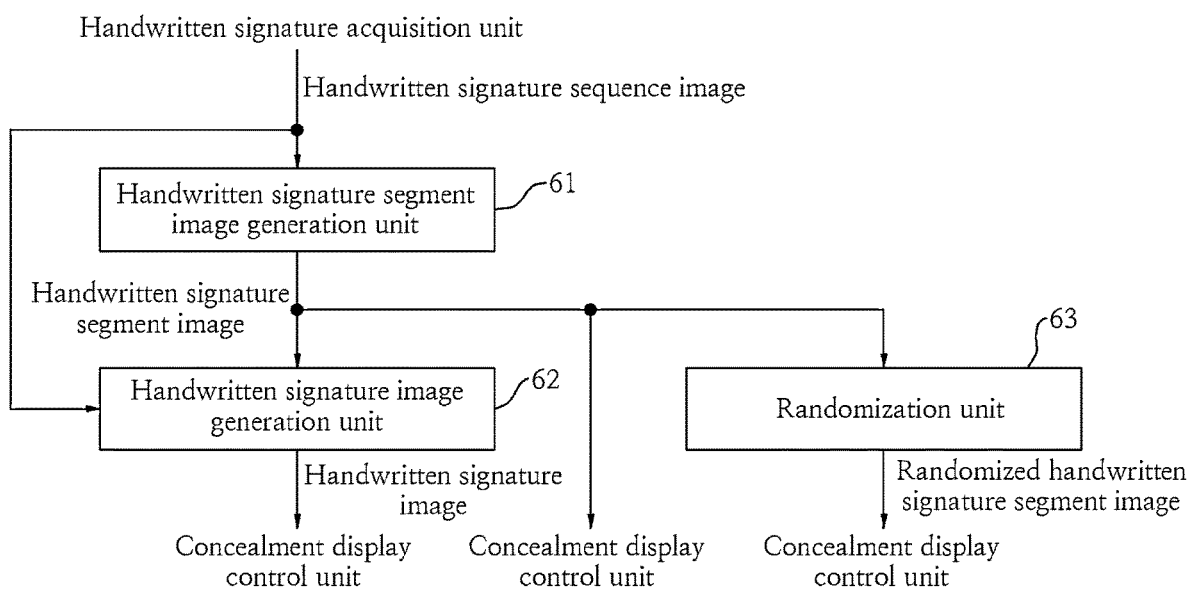
FIG. 3 is a diagram illustrating a configuration of a handwritten signature blinding pre-processing unit of an apparatus for blinding a handwritten signature for authentication according to the present invention.
Figure 5:
FIG. 5 is a diagram illustrating a handwritten signature display method according to a first embodiment of the present invention.
Figure 5:
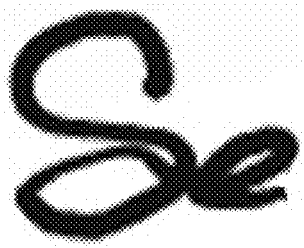
Figure 5:
Figure 5:
Figure 6:
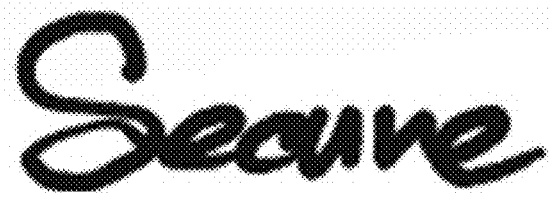
FIG. 6 is a diagram illustrating a handwritten signature display method according to a second embodiment of the present invention.
Figure 6:
Figure 6:
Figure 6:
Figure 6:
Figure 7:
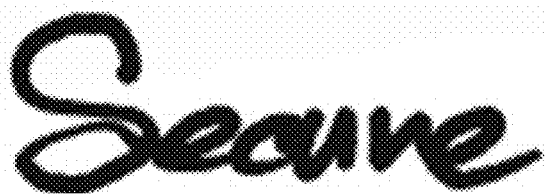
FIG. 7 is a diagram illustrating a handwritten signature display method according to a third embodiment of the present invention.
Figure 7:
Figure 7:
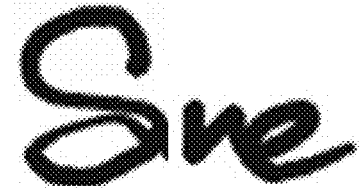
Figure 7:
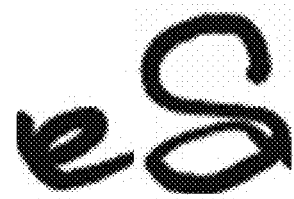
Figure 7:

FIG. 3 is a diagram illustrating a configuration of a handwritten signature blinding pre-processing unit 60 of an apparatus for blinding a handwritten signature for authentication according to the present invention. FIG. 5 is a diagram illustrating a handwritten signature display method according to a first embodiment of the present invention. FIG. 6 is a diagram illustrating a handwritten signature display method according to a second embodiment of the present invention. FIG. 7 is a diagram illustrating a handwritten signature display method according to a third embodiment of the present invention. Hereinafter, the description will be made with reference to FIGS. 3, and 5 to 7.

The handwritten signature blinding pre-processing unit 60 may include a handwritten signature segment image generation unit 61, a handwritten signature image generation unit 62, and a randomization unit 63.

The handwritten signature segment image generation unit 61 divides, when the handwritten signature sequence image is input from the handwritten signature acquisition unit 50, the handwritten signature sequence image according to a handwritten signature segment condition of the blinding setting information stored in advance in the storage unit 30 so as to generate and output the handwritten signature segment images.

For example, when the signatory writes a handwritten signature of "Secuve" as shown in the reference numeral 101 of FIG. 5, the reference numeral 201 of FIG. 6, and the reference numeral 301 of FIG. 7, the handwritten signature segment image generation unit 61 divides the handwritten signature of "Secuve" into "Se", "cu", and "ve" as shown in the reference numerals 102 to 104 of FIG. 5 or into "S", "e", "cu", and "ve" as shown in the reference numerals 202 to 205 of FIG. 6 and in the reference numerals 303 to 305 of FIG. 7 according to the segment division condition information. The handwritten signature segment image generation unit 61 generates and outputs the handwritten signature segment images resulting from the division.

The handwritten signature image generation unit 62 outputs, to the blinding display control unit 70 through the handwritten signature segment image generation unit 61, the handwritten signature sequence image as the handwritten signature image or outputs the handwritten signature sequence image in which the handwritten signature segment images input in order are combined, as the handwritten signature image.

The randomization unit 63 receives, from the handwritten signature image generation unit 61, the handwritten signature segment images resulting from the division in order, randomly shuffles the sequence of the handwritten signature segment images as shown in the reference numerals 202 to 205 of FIG. 6 and the reference numerals 302 to 305 of FIG. 7 according to the blinding setting information, and outputs the result to the blinding display control unit 70.

Figure 4:
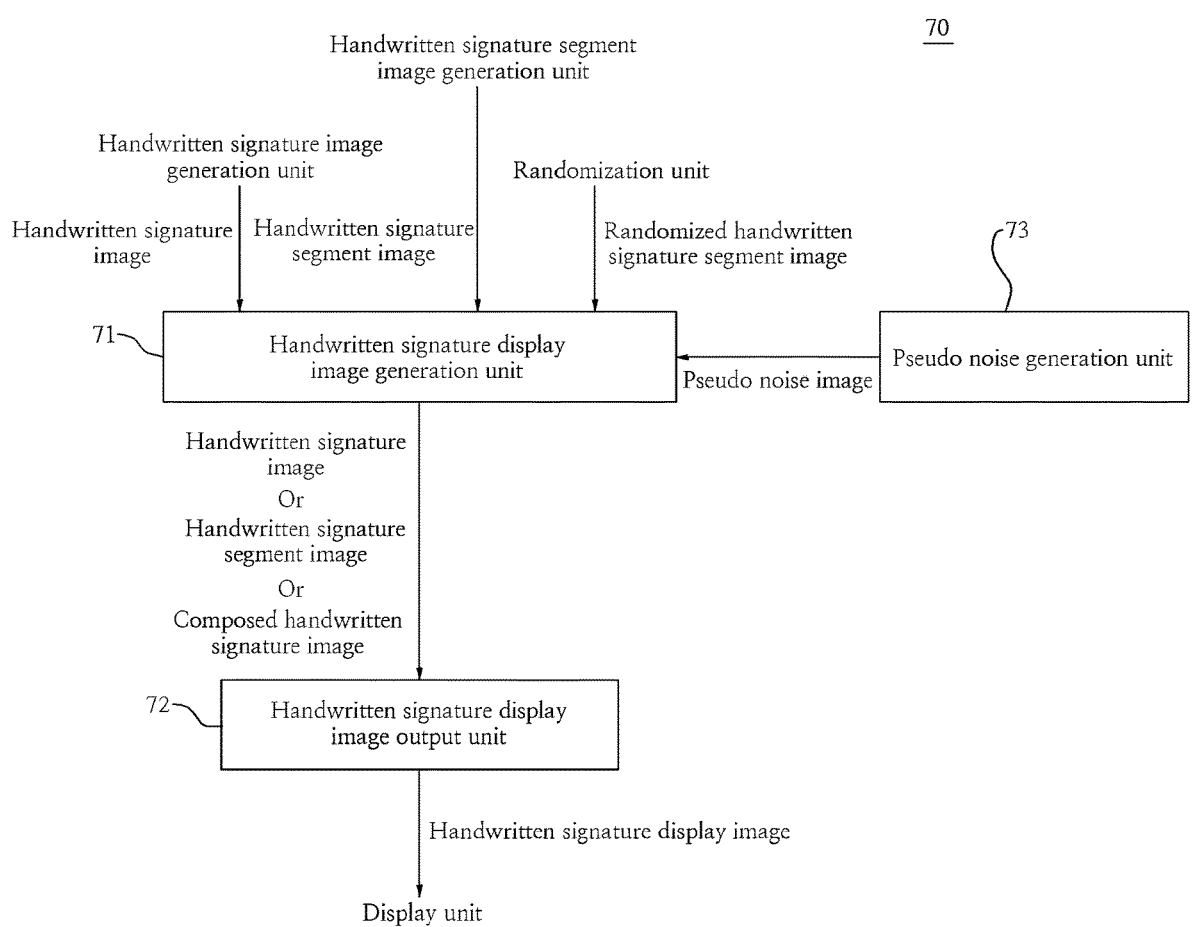
FIG. 4 is a diagram illustrating a configuration of a blinding display control unit of an apparatus for blinding a handwritten signature for authentication according to the present invention.
Figure 8:
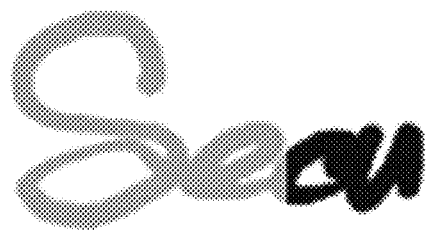
FIG. 8 is a diagram illustrating a handwritten signature display method according to a fourth embodiment of the present invention.
Figure 8:
Figure 9:
FIG. 9 is a diagram illustrating a handwritten signature display method according to a fifth embodiment of the present invention.
Figure 9:

FIG. 4 is a diagram illustrating a configuration of a blinding display control unit 70 of an apparatus for blinding a handwritten signature for authentication according to the present invention. FIG. 8 is a diagram illustrating a handwritten signature display method according to a fourth embodiment of the present invention. FIG. 9 is a diagram illustrating a handwritten signature display method according to a fifth embodiment of the present invention. Hereinafter, the description will be made with reference to FIGS. 4, 8, and 9.

The blinding display control unit 70 includes a handwritten signature display image generation unit 71 and a handwritten signature display image output unit 72. According to an embodiment, the blinding display control unit 70 may further includes a pseudo noise generation unit 73.

The pseudo noise generation unit 73 generates the pseudo noise image including an image of any figure and outputs the pseudo noise image to the handwritten signature display image generation unit 71. The pseudo noise image is an image composed with the handwritten signature image or with the handwritten signature segment images. The pseudo noise image may be an image that makes the handwritten signature image or the handwritten signature segment images to be clearly visible only from the front and not to be hardly visible from the surrounding areas.

The handwritten signature display image generation unit 71 receives the handwritten signature image from the handwritten signature image generation unit 62. According to an embodiment, the handwritten signature display image generation unit 71 may receive the handwritten signature segment images from the handwritten signature segment image generation unit 61, may receive the handwritten signature segment images of which the sequence is randomized from the randomization unit 63, or may receive the pseudo noise image from the pseudo noise generation unit 73.

The handwritten signature display image generation unit 71 may output the handwritten signature image to the handwritten signature display image output unit 72 according to the blinding setting information.

Also, the handwritten signature display image generation unit 71 may output the handwritten signature segment images to the handwritten signature display image output unit 72 according to the blinding setting information.

Also, the handwritten signature display image generation unit 71 may output the composed handwritten signature image to the handwritten signature display image output unit 72 according to the blinding setting information.

The handwritten signature display image output unit 72 may not output the handwritten signature image output from the handwritten signature display image generation unit 71 to the display unit 20 and may output the handwritten signature image only to the handwritten signature processing unit 80 on the basis of the blinding setting information according to an embodiment, so that the entire handwritten signature is not exposed to a third party and is blinded.

Also, the handwritten signature display image output unit 72 may display the handwritten signature image, which is the result of writing the handwritten signature, on the display unit 20 only for a predetermined time and then may delete the handwritten signature image on the basis of the blinding setting information according to an embodiment.

Also, the handwritten signature display image output unit 72 may display the handwritten signature segment images input in order on the display unit 20 as shown in the reference numerals 102 to 104 of FIG. 5.

Also, when the handwritten signature segment images of which the sequence is randomly shuffled are input, the handwritten signature display image output unit 72 displays, on the display unit 20, the handwritten signature segment images of which the sequence is randomly shuffled as shown in the reference numerals 202 to 205 of FIG. 6.

Also, when the handwritten signature segment images of which the sequence is randomly shuffled are input, the handwritten signature display image output unit 72 displays, on the display unit 20, the handwritten signature segment images by attaching them as shown in the reference numerals 302 to 305 of FIG. 7.

Also, the handwritten signature display image output unit 72 makes the preceding handwritten signature segment image faint or increases the transparency level, sets only the currently displayed handwritten signature segment image to be normal, and displays the result on the display unit 20 as shown in the reference numerals 401 and 402 of FIG. 8. The reference numeral 401 refers to a case where a first handwritten signature segment image is faint and a second handwritten signature segment image is normally displayed. The reference numeral 402 refers to a case where the first and the second handwritten signature segment image are faint and a third handwritten signature segment image is displayed normally.

Also, the handwritten signature display image output unit 72 may generate filtered handwritten signature segment images by applying filtering to the handwritten signature image or the handwritten signature segment images input as shown in the reference numerals 501 and 502 of FIG. 9, and then may display the result on the display unit 20.

Also, the handwritten signature display image output unit 72 may receive and display the composed handwritten signature image on the display unit 20 according to an embodiment.

In the meantime, the present invention is not limited to the above-described exemplary embodiments, and it will be understood by those skilled in the art that various improvement, modifications, substitutions, and additions may be made without departing from the scope of the present invention. It is noted that if embodiments by such improvements, modifications, substitutions, and additions are within the scope of the following appended claims, the technical ideas thereof are also within the scope of the present invention.

DESCRIPTION OF THE REFERENCE NUMERALS IN THE DRAWINGS

10: Handwritten signature input unit
20: Display unit
30: Storage unit
40: Control unit
50: Handwritten signature acquisition unit
51: Handwritten signature sequence data buffering unit
52: Handwritten signature sequence image generation unit
60: Handwritten signature blinding pre-processing unit
61: Handwritten signature segment image generation unit
62: Handwritten signature image generation unit
63: Randomization unit
70: Blinding display control unit
71: Handwritten signature display image generation
72: Handwritten signature display image output unit
73: Pseudo noise generation unit
80: Handwritten signature processing unit

What is claimed is:

1. An apparatus for blinding a handwritten signature for authentication, the apparatus comprising:
a handwritten signature input unit configured to output handwritten signature sequence data as a result of writing a handwritten signature by a user; and
a processor configured to:
generate a handwritten signature image corresponding to the handwritten signature sequence data acquired from the handwritten signature input unit;

blind at least part of the handwritten signature image according to preset blinding setting information; and control the apparatus to display an unblinded part of the handwritten signature, wherein the processor is further configured to:

generate and output a handwritten signature sequence image corresponding to the handwritten signature sequence data acquired from the handwritten signature input unit;

generate handwritten signature segment images by dividing the handwritten signature sequence image according to a segment division condition of the preset blinding setting information, and output the generated handwritten signature segment images;

control the apparatus to display, when the handwritten signature segment images are started to be input, only an unblinded part of the handwritten signature segment images that are input until the whole handwritten signature image is generated according to the blinding setting information, wherein the processor is further configured to:

divide the handwritten signature sequence image according to the segment division condition of the preset blinding setting information so as to generate and output the handwritten signature segment images;

receive any one or more among the handwritten signature sequence image and the handwritten signature segment images to generate and output the handwritten signature image; and randomly shuffle a sequence of the handwritten signature segment images according to the blinding setting information, and output the handwritten signature segment images to be displayed.

2. The apparatus of claim 1, wherein the processor is further configured to:

generate and output a handwritten signature sequence image corresponding to the handwritten signature sequence data acquired from the handwritten signature input unit; and control the apparatus to display, when the handwritten signature sequence image is started to be input and the writing of the handwritten signature is completed, the handwritten signature image constructed of the input handwritten signature sequence image only for a predetermined time on the display unit according to the blinding setting information, and then deleting the handwritten signature image.

3. The apparatus of claim 1, wherein the processor is further configured to:

divide the handwritten signature sequence image according to the segment division condition of the preset blinding setting information so as to generate and output the handwritten signature segment images;

receive any one or more among the handwritten signature sequence image and the handwritten signature segment images to generate and output the handwritten signature image; and control the apparatus to display the handwritten signature segment images in order according to the blinding setting information.

4. The apparatus of claim 1, wherein the processor is further configured to:

generate and output a handwritten signature sequence image corresponding to the handwritten signature sequence data acquired from the handwritten signature input unit;

control the apparatus to display, when the handwritten signature sequence image is started to be input, the handwritten signature sequence image according to the blinding setting information;

generate and output a pseudo noise image; and according to the blinding setting information, intactly output the handwritten signature sequence image or compose the handwritten signature sequence image with the pseudo noise image to output a result of the composition.

5. The apparatus of claim 1, wherein the blinding setting information includes one or more among blinding coverage setting information for setting whether a whole or only a part of the handwritten signature being written is blinded, segment division condition information in a case of partial blinding, segment randomization information indicating whether the divided handwritten signature segment images are displayed in order or in a randomly shuffled manner, pseudo noise image composition information indicating whether a pseudo noise image is composed with the handwritten signature image for display, temporary display information of a final handwritten signature image which indicates whether the handwritten signature image is displayed only for a predetermined time when the writing of the handwritten signature is completed, information on setting the number of handwritten signature segments to be displayed, random display information indicating whether positions to be displayed are randomly displayed when the number of the handwritten signature segments to be displayed is two or more according to the information on setting the number of the handwritten signature segments to be displayed, a transparency level value, filtering option information indicating whether filtering is applied, and information on whether the two or more handwritten signature segments are displayed close together.

6. The apparatus of claim 1, wherein the segment division condition includes any one or more among a predetermined time, a predetermined space, writing with a break, a syllable, and a letter, wherein the predetermined time is a predetermined time basis or random time basis for dividing the input handwritten signature sequence image and the predetermined space is a predetermined-sized space basis or random-sized space basis for dividing the input handwritten signature sequence image.

7. The apparatus of claim 1, wherein regarding the handwritten signature segment images, a preceding handwritten signature segment image is faintly displayed or is invisibly displayed by increasing a transparency level, and only a currently displayed handwritten signature segment image is displayed normally.

8. A method of blinding a handwritten signature for authentication, the method comprising:

generating a handwritten signature sequence image corresponding to handwritten signature sequence data acquired from a handwritten signature input unit;

generating a handwritten signature image corresponding to the handwritten signature sequence data acquired from the handwritten signature input unit, blinding at least part of the handwritten signature image according to preset blinding setting information, and displaying an unblinded part of the handwritten signature, generating and outputting the handwritten signature sequence image corresponding to the handwritten signature sequence data acquired from the handwritten signature input unit;

generating handwritten signature segment images by dividing the handwritten signature sequence image according to a segment division condition of the preset blinding setting information, and outputting the generated handwritten signature segment images;

displaying, when the handwritten signature segment images are started to be input, only an unblinded part of the handwritten signature segment images that are input until the whole handwritten signature image is displayed according to the blinding setting information;

dividing the handwritten signature sequence image according to the segment division condition of the preset blinding setting information so as to generate and output the handwritten signature segment images;

receiving any one or more among the handwritten signature sequence image and the handwritten signature segment images to generate and output the handwritten signature image; and randomly shuffling a sequence of the handwritten signature segment images output according to the blinding setting information and outputting the handwritten signature segment images, wherein the handwritten signature segment images are displayed in randomly shuffled order.

9. The method of claim 8, further comprising:

generating and outputting the handwritten signature sequence image corresponding to the handwritten signature sequence data; and displaying, when the handwritten signature sequence image is started to be input and when writing of a handwritten signature is completed, the handwritten signature image constructed of the input handwritten signature sequence image only for a predetermined time according to the blinding setting information, and then deleting the handwritten signature image.

10. The method of claim 8, further comprising:

dividing the handwritten signature sequence image according to the segment division condition of the preset blinding setting information so as to generate and output the handwritten signature segment images; and receiving any one or more among the handwritten signature sequence image and the handwritten signature segment images to generate and output the handwritten signature image, and wherein only the unblinded part of the handwritten signature segment images is displayed in order according to the blinding setting information.

11. The method of claim 8, further comprising:

generating and outputting the handwritten signature sequence image corresponding to the handwritten signature sequence data acquired from the handwritten signature input unit;

displaying, when the handwritten signature sequence image is started to be input, the handwritten signature sequence image according to the blinding setting information generating and outputting a pseudo noise image; and according to the blinding setting information, intactly outputting the handwritten signature sequence image, or composing the handwritten signature sequence image with the pseudo noise image and outputting a result of the composition.

12. The method of claim 8, wherein the blinding setting information includes one or more among blinding coverage setting information for setting whether a whole or only a part of the handwritten signature being written is blinded, segment division condition information in a case of partial blinding, segment randomization information indicating whether handwritten signature segment images resulting from division are displayed in order or in a randomly shuffled manner, pseudo noise image composition information indicating whether a pseudo noise image is composed with the handwritten signature image for display, temporary display information of a final handwritten signature image which indicates whether the handwritten signature image is displayed only for a predetermined time when writing of the handwritten signature is completed, information on setting the number of handwritten signature segments to be displayed, random display information indicating whether positions to be displayed are randomly displayed when the number of the handwritten signature segments to be displayed is two or more according to the information on setting the number of the handwritten signature segments to be displayed, a transparency level value, filtering option information, and information on whether the two or more handwritten signature segments are displayed close together.

13. The method of claim 8, wherein the segment division condition includes any one or more among a predetermined time, a predetermined space, writing with a break, a syllable, and a letter, wherein the predetermined time is a predetermined time basis or random time basis for dividing the input handwritten signature sequence image and the predetermined space is a predetermined-sized space basis or random-sized space basis for dividing the input handwritten signature sequence image.

14. The method of claim 8, wherein regarding the handwritten signature segment images, a preceding handwritten signature segment image is faintly displayed or is invisibly displayed by increasing a transparency level for output, and only a currently displayed handwritten signature segment image is displayed normally.

\* \* \* \* \*